(12) United States Patent
Tabaru

(10) Patent No.: US 10,169,008 B2
(45) Date of Patent: Jan. 1, 2019

(54) INFORMATION PROCESSING DEVICE AND COMPILATION METHOD

(71) Applicant: FUJITSU LIMITED, Kawasaki-shi, Kanagawa (JP)

(72) Inventor: Tsuguchika Tabaru, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/484,547

(22) Filed: Apr. 11, 2017

(65) Prior Publication Data
US 2017/0329584 A1    Nov. 16, 2017

(30) Foreign Application Priority Data

May 10, 2016  (JP) .................. 2016-094763

(51) Int. Cl.
| | | |
|---|---|---|
| G06F 9/44 | (2018.01) | |
| G06F 8/41 | (2018.01) | |
| G06F 9/448 | (2018.01) | |
| G06F 8/30 | (2018.01) | |

(52) U.S. Cl.
CPC .............. G06F 8/433 (2013.01); G06F 8/315 (2013.01); G06F 8/443 (2013.01); G06F 9/4488 (2018.02)

(58) Field of Classification Search
CPC ........ G06F 8/315; G06F 8/433; G06F 9/4428; G06F 9/4488
USPC .................................................. 717/140–146
See application file for complete search history.

(56) References Cited

U.S. PATENT DOCUMENTS

| | | | | |
|---|---|---|---|---|
| 6,158,024 A | * | 12/2000 | Mandal | G06F 11/3466 702/182 |
| 7,506,319 B2 | * | 3/2009 | Purcell | G06F 11/3419 717/125 |
| 2002/0151334 A1 | * | 10/2002 | Sharma | H04M 1/274583 455/566 |

(Continued)

FOREIGN PATENT DOCUMENTS

| | | |
|---|---|---|
| JP | 6-214800 | 8/1994 |
| JP | 11-212802 | 8/1999 |
| JP | 2005-182562 | 7/2005 |

OTHER PUBLICATIONS

Stallman, "Using and Porting the GNU Compiler Collection", Jun. 2001, Free Software Foundation, Chapters 1-10, pp. 3-250.*

(Continued)

*Primary Examiner* — Ted T. Vo
(74) *Attorney, Agent, or Firm* — Staas & Halsey LLP

(57) ABSTRACT

An apparatus includes a processor coupled to a memory and configured to extract a class in which a constructor or an assignment operator included in source code or a combination of the constructor and the operator is used, identify a call to the constructor or operator or the combination, calculate the number of times of access to member variables, indicated in the call identified and a periphery of the call; compare the number, calculated, of times of the access with the number of times of memory access, and generate intermediate code having, added thereto, information to be used to execute a process for copying the constructor or the operator or the combination in units of member variables, and generate intermediate code having information added thereto based on the call when the number, calculated, of times of the access is smaller than the number of times of the memory access.

5 Claims, 23 Drawing Sheets

(56) References Cited

U.S. PATENT DOCUMENTS

2005/0138612 A1     6/2005   Asao
2008/0034355 A1*   2/2008   Shen ........................ G06F 8/443
                                                                                                         717/148

OTHER PUBLICATIONS

EmbeddedInn, "Test coverage analysis with GCOV", 2014, received in https://web.archive.org/web/20140309134508/ from https://embeddedinn.wordpress.com/tutorials/test-coverage-analysis-with-gcov , 6 pages.*

* cited by examiner

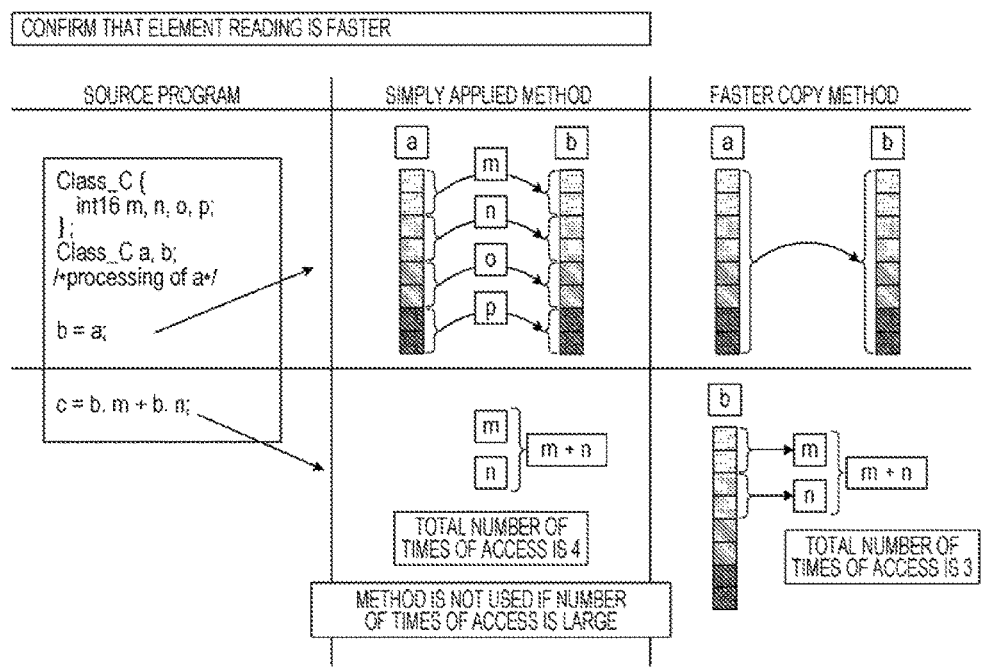

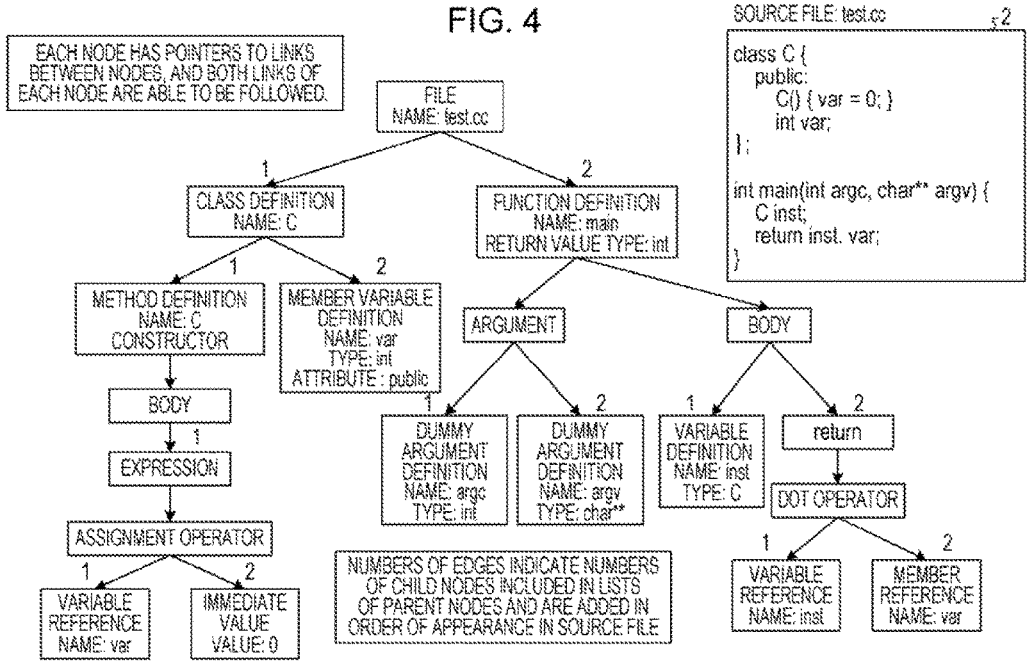

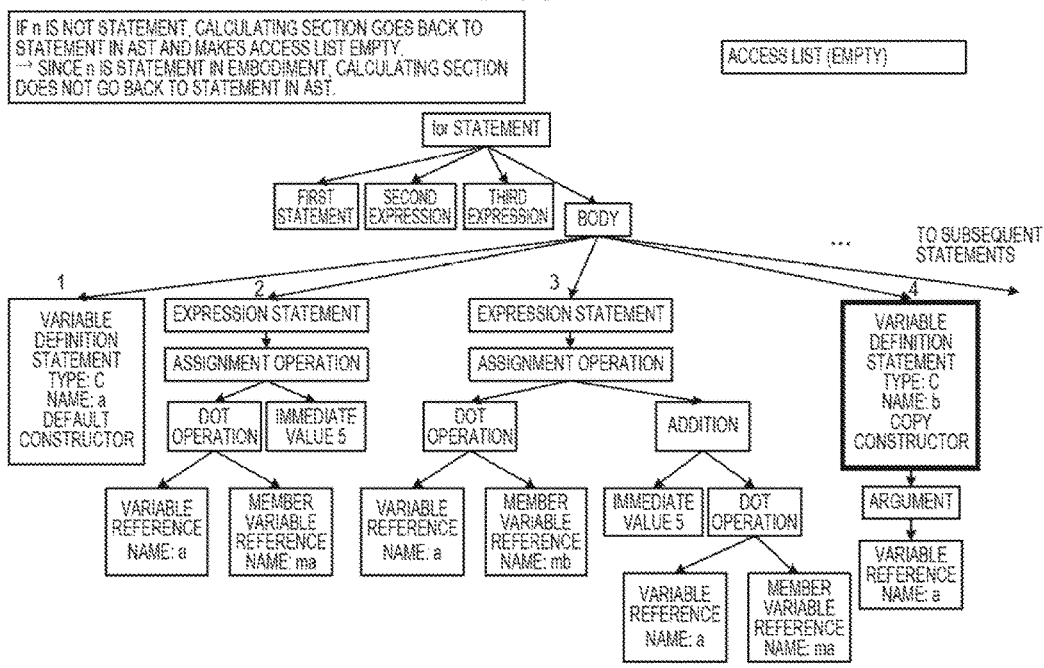

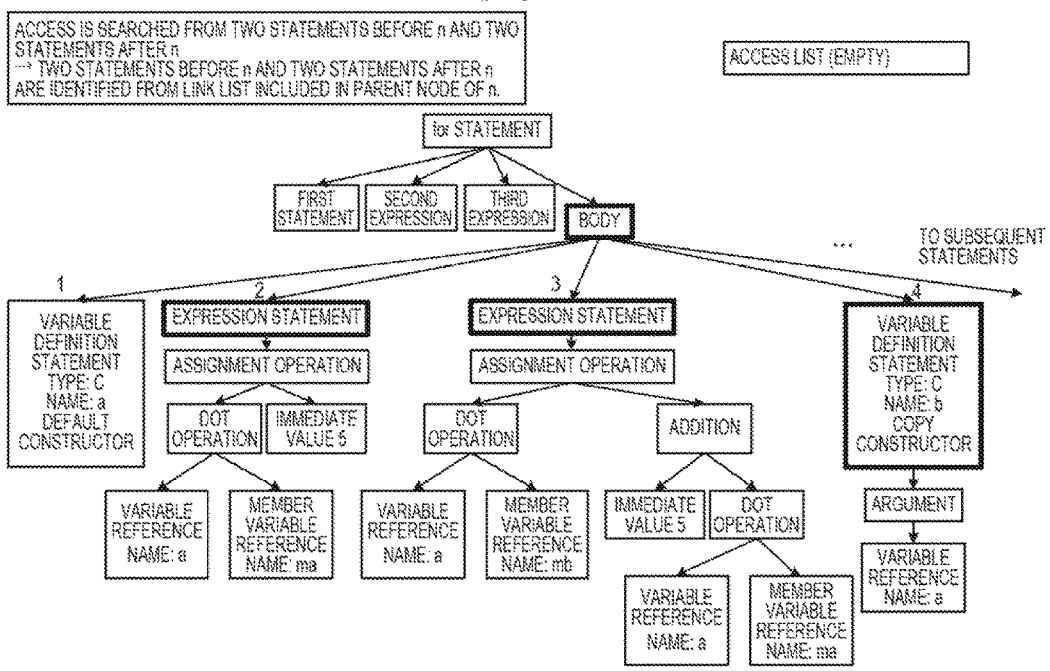

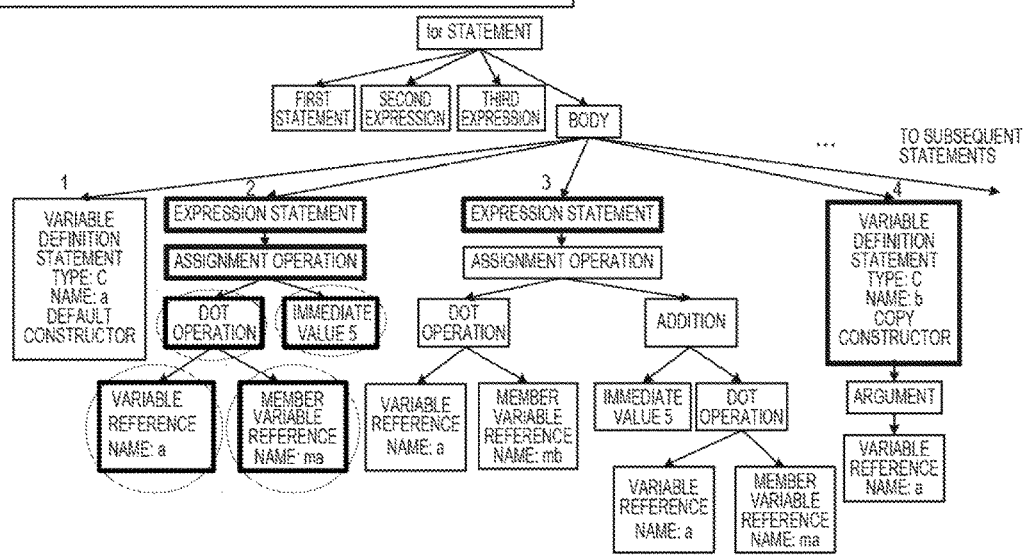

INFORMATION PROCESSING DEVICE AND COMPILATION METHOD

CROSS-REFERENCE TO RELATED APPLICATION

This application is based upon and claims the benefit of priority of the prior Japanese Patent Application No. 2016-094763, filed on May 10, 2016, the entire contents of which are incorporated herein by reference.

FIELD

The embodiment discussed herein is related to an information processing device and a compilation method.

BACKGROUND

In an object-orientation language such as C++, a copy process is executed when a copy constructor or an assignment operator is used. FIG. 14 is a diagram describing the copy process executed when the copy constructor or the assignment operator is used.

As illustrated in FIG. 14, the copy constructor defines a variable based on another variable of the same type, and the assignment operator updates the value of the variable based on the other variable of the same type. For example, if a is a variable of a class Class_C, Class_C b(a) is a copy constructor that defines a variable b based on the variable a of the same class Class_C. In this case, the variable b is initialized to the variable a. Specifically, the value of the variable a is copied as the value of the variable b.

In addition, if a and b are variables of Class_C, b=a is an assignment operator that updates the value of the variable b based on the variable a. In this case, the variable b is updated to the variable a. Specifically, the value of the variable a is copied as the value of the variable b.

Regarding compilation techniques, there is a technique for improving compilation performance of a computer having a vector operation function by selecting, as an object to be used for inline expansion of a character operation procedure, any of a scalar command and a vector command that minimizes a time period for executing the character operation procedure.

In addition, there is a compiling device that improves runtime performance by analyzing characteristics of the structure of a program and copying details of a memory for data caching before a load command at the stage of compilation.

In addition, there is a compilation technique for converting a function of calling a function having a pass-by-value argument into a function of calling a function having a pass-by-reference argument if a function that may indirectly call the function having the pass-by-value argument does not exist and the pass-by-value argument is not updated within the definition of the pass-by-value argument. By this compilation technique, a code size may be reduced.

Examples of related art are Japanese Laid-open Patent Publications Nos. 06-214800, 11-212802, and 2005-182562.

There is a problem that pointless memory access is executed in the copying between the variables that is illustrated in FIG. 14. FIG. 15 is a diagram describing the problem with the copying between the variables that is illustrated in FIG. 14. In FIG. 15, Class_C is a class of 16-bit integer variables m, n, o, and p that are member variables, and a and b are variables of the class Class_C. If an assignment operator b=a is used, values of a.m, a.n, a.o, and a.p are copied to b.m, b.n, b.o, and b.p. The copying is executed in bytes in the copy process.

If c=b.m+b.n+b.o+b.p is calculated immediately after b=a, and the values of a.m, a.n, a.o, and a.p read from a memory in processing of b=a are used, pointless memory access may be reduced. However, since b.m, b.n, b.o, and b.p are read from the memory in units of 2 bytes, the values of a.m, a.n, a.o, and a.p read from the memory in bytes are not able to be used. Thus, b.m, b.n, b.o, and b.p are read from the memory again, pointless memory access is executed, and the number of times of memory access increases.

SUMMARY

According to an aspect of the invention, an information processing device includes a memory; and a processor coupled to the memory and the processor configured to: extract a class in which a constructor included in a source code or an assignment operator included in the source code or a combination of the constructor and the assignment operator is used, identify a call to the constructor or assignment operator included in the class extracted by the processor or the combination of the constructor and the assignment operator, calculate a number of times of access to member variables, indicated in the call identified by the processor and a periphery of the call, of a copy source and copy destination of a copy process executed based on the call; compare the number, calculated by the processor, of times of the access with the number of times of memory access related to the copy source and copy destination of the call and the periphery of the call in a case where a default copy process is executed based on the call, and generate an intermediate code having, added thereto, information to be used to execute a process for copying the constructor or the assignment operator or the combination of the constructor and the assignment operator in units of member variables and generate an intermediate code having information added thereto based on the call when the number, calculated by the processor, of times of the access is smaller than the number of times of the memory access.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2B is a diagram describing a second requirement for the optimization;

FIG. 4 is a diagram illustrating an example of an AST;

FIG. 5C is a diagram describing the peripheral search;

FIG. 5D is a diagram describing the peripheral search;

FIG. 5E is a diagram describing the peripheral search;

DESCRIPTION OF EMBODIMENT

Hereinafter, an embodiment of an information processing device disclosed herein, a compilation method disclosed herein, and a compiler program disclosed herein is described in details with reference to the accompanying drawings. The embodiment does not limit techniques disclosed herein.

Embodiment

Figure 1:
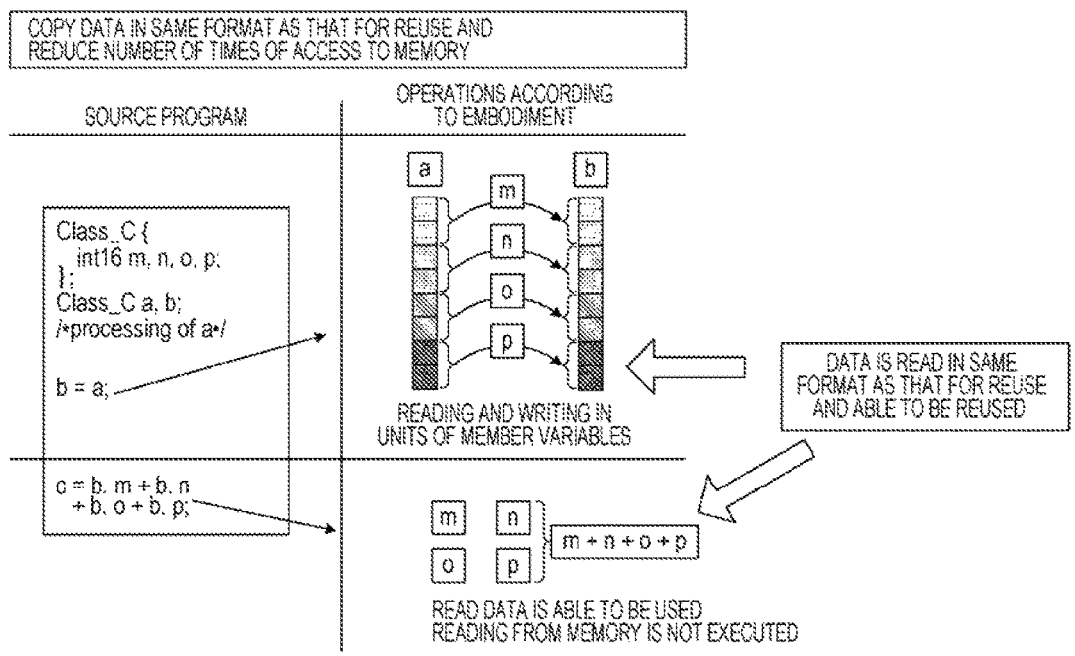
FIG. 1 is a diagram describing optimization by a compiler according to an embodiment.

First, optimization by a compiler according to the embodiment is described. FIG. 1 is a diagram describing the optimization by the compiler according to the embodiment. As illustrated in FIG. 1, the compiler according to the embodiment detects that a statement to reuse data read from a memory or c=b.m+b.n+b.o+b.p exists immediately after b=a. Then, the compiler according to the embodiment generates a code for reading, from the memory, data in the same format as that of data read from the memory for c=b.m+b.n+b.o+b.p in a copy process executed based on b=a.

Specifically, since the data is read in units of 2 bytes for c=b.m+b.n+b.o+b.p, the compiler according to the embodiment generates the code for reading data from the memory in units of 2 bytes or in units of member variables in the copy process executed based on b=a.

Thus, the compiler according to the embodiment may repeatedly reuse data read from the memory in the copy process and registered in a register and reduce the number of times of memory access.

Figure 2A:
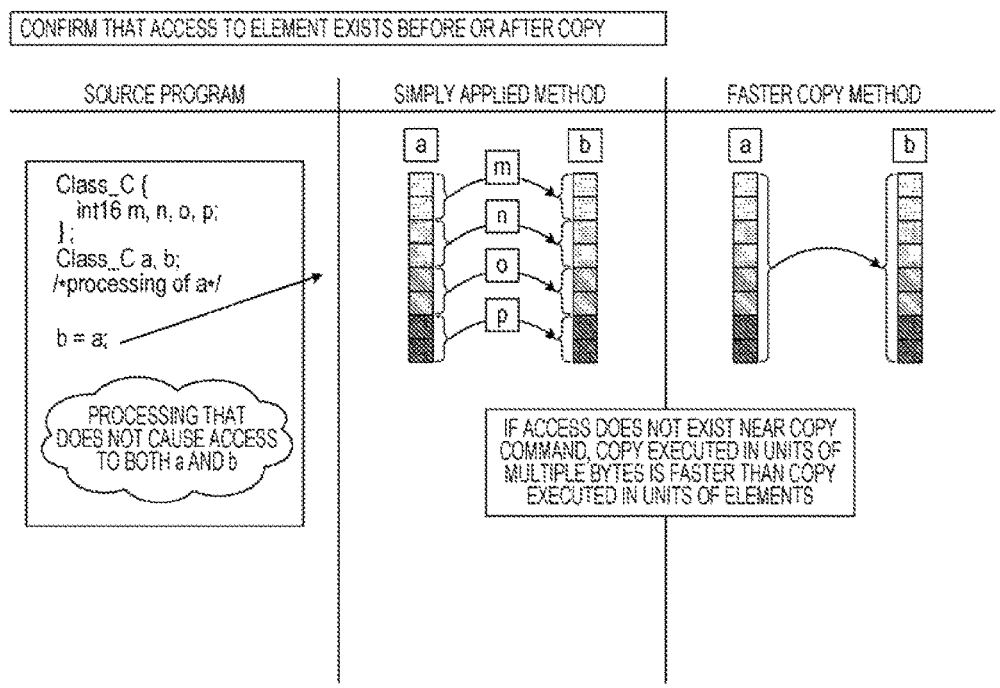
FIG. 2A is a diagram describing a first requirement for the optimization.

The compiler according to the embodiment confirms two requirements for the optimization. FIG. 2A is a diagram describing the first requirement for the optimization. As illustrated in FIG. 2A, the compiler according to the embodiment confirms whether or not access to an element (member variable) of the same variable exists before or after b=a. If the access to the element of the same variable does not exist before or after b=a, the compiler does not generate a code for copying in units of elements in the copy process executed based on b=a. If a multibyte copy command exists and is used in the copy process executed based on b=a, the copying rate is increased.

FIG. 2B is a diagram describing the second requirement for the optimization. As illustrated in FIG. 2B, if the access to the element of the same variable exists before or after b=a and the number of times of access increases, the compiler according to the embodiment does not generate the code for copying in units of elements in the copy process executed based on b=a. In FIG. 2B, if c=b.m+b.n exists immediately after b=a, the number of times of memory access in the copying executed in units of elements is 4. If an 8-byte copy command is able to be used, the number of times of memory access is 3, or access to a, access to b.m, and access to b.n are executed.

In this manner, the compiler according to the embodiment confirms the two requirements described with reference to FIGS. 2A and 2B, executes the optimization, and may avoid an increase in the number of times of memory access by the optimization.

Copy constructors include a user-specified copy constructor for which a user defines a process, while assignment operators include a user-specified assignment operator for which a user defines a process. However, the user-specified copy constructor and the user-specified assignment operator are not targets in the embodiment. Targets to be optimized by the compiler according to the embodiment are an implicit copy constructor and an implicit assignment operator that do not include a user definition.

In the following description, if it is apparent that a copy constructor is an implicit copy constructor and that an assignment operator is an implicit assignment operator, the implicit copy constructor and the implicit assignment operator are merely referred to as copy constructor and assignment operator, respectively, in some cases.

Figure 3:
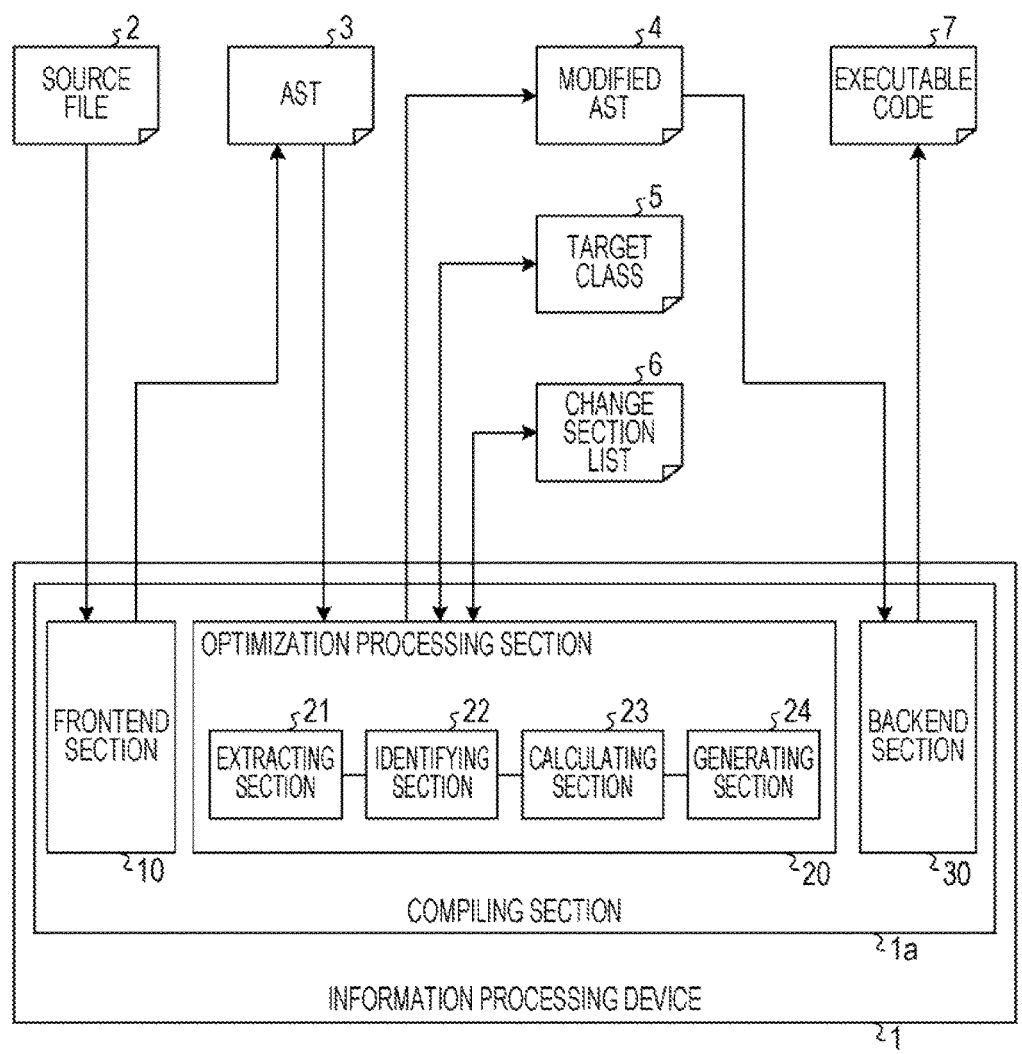
FIG. 3 is a diagram illustrating the configuration of an information processing device according to the embodiment.

Next, the configuration of an information processing device according to the embodiment is described. FIG. 3 is a diagram illustrating the configuration of the information processing device according to the embodiment. As illustrated in FIG. 3, the information processing device 1 according to the embodiment processes information and has a compiling section 1a. The compiling section 1a reads a source file 2 and generates an executable code 7.

The compiling section 1a includes a frontend section 10, an optimization processing section 20, and a backend section 30. The frontend section 10 reads the source file 2, executes lexical analysis, syntax analysis, and the like, and outputs an abstract syntax tree (AST) 3.

The optimization processing section 20 receives the AST 3, executes the optimization on a copy constructor and an assignment operator to modify the AST 3, and outputs a modified AST 4. In addition, the optimization processing section 20 generates, during optimization processing, a target class 5 that is to be optimized. Furthermore, the optimization processing section 20 generates, during the optimization processing, a change section list 6 of sections indicating access to member variables of copy sources and copy destinations of copy processes executed based on a call to the copy constructor of the class to be optimized and a call to the assignment operator of the class to be optimized.

The optimization processing section 20 may generate, from the AST 3, an AST to which interprocedural optimization and inlining are applied. Then, the optimization processing section 20 may use the generated AST to optimize the copy constructor and the assignment operator.

The optimization processing section 20 identifies a class in which the copy constructor and the assignment operator are used. The optimization processing section 20 identifies sections in which the copy constructor and the assignment operator are used. Then, the optimization processing section 20 confirms the requirements for the optimization and optimizes the copy constructor and the assignment operator. Then, the optimization processing section 20 modifies the AST 3 to generate the modified AST 4.

The optimization processing section 20 may execute other optimization before generating the modified AST 4. In addition, the optimization processing section 20 may use other intermediate representation (IR) or a bit code level instead of the AST 3 and optimize the copy constructor and the assignment operator.

The backend section 30 receives the modified AST 4 and outputs the executable code 7 to be executed by the information processing device 1 or another information processing device. The compiling section 1a may execute optimization of various types in the frontend section 10 and the backend section 30 in order to improve the speed of executing the executable code 7 and the like.

The optimization processing section 20 includes an extracting section 21, an identifying section 22, a calculating section 23, and a generating section 24. The extracting section 21 analyzes the AST 3 and extracts, as a class to be optimized, a class in which the implicit copy constructor or the implicit assignment operator is used. FIG. 4 is a diagram illustrating an example of the AST 3. FIG. 4 illustrates an AST 3 corresponding to the source file 2 whose name is test.cc.

As illustrated in FIG. 4, the AST 3 is a tree indicating results of analyzing the syntax of the source file 2. In the AST 3, a file corresponding to the source file 2 is treated as a root. Nodes indicate syntax elements, while links between the nodes indicate parent and child relationships between the syntax elements. For example, the file whose name is test.cc is composed of a class definition whose name is C and a function definition whose name is main.

Regarding each of the links between the nodes, a parent node has a pointer to a child node, the child node has a pointer to the parent node, and both parent and child nodes may follow the link. In FIG. 4, numbers indicated at edges of the links are numbers of child nodes indicated in lists of parent nodes and are in order of appearance in the source file 2.

The extracting section 21 follows the nodes of the AST 3 in order from the root of the AST 3, extracts the class to be optimized, and generates the target class 5. The extracting section 21 does not optimize a class inheriting another class, a class including a member variable other than member variables of a basic type, and a class in which the number of member variables exceeds a predetermined upper limit value.

The identifying section 22 analyzes the AST 3 and identifies a call to the copy constructor or assignment operator of the class to be optimized.

The calculating section 23 searches the call to the copy constructor or assignment operator of the class to be optimized and a periphery of the identified call and calculates the number of times of access to member variables of a copy source and copy destination of the copy process executed based on the call. The periphery indicates a predetermined number of statements immediately before and after a statement including the call to the copy constructor or assignment operator of the class to be optimized, for example.

The calculating section 23 calculates the number of times of access to an element of a copy source instance for a statement before the call to the copy constructor or assignment operator of the class to be optimized. In addition, the calculating section 23 calculates the number of times of access to the element of the copy source instance and the number of times of access to an element of a copy destination instance for a statement after the call to the copy constructor or assignment operator of the class to be optimized.

The statements before and after the statement including the call to the copy constructor or assignment operator of the class to be optimized may be identified based on the analysis of a control flow graph and a data flow graph. If a branch is included, the calculating section 23 may calculate the number of times of access based on a branch probability.

Figure 5A:
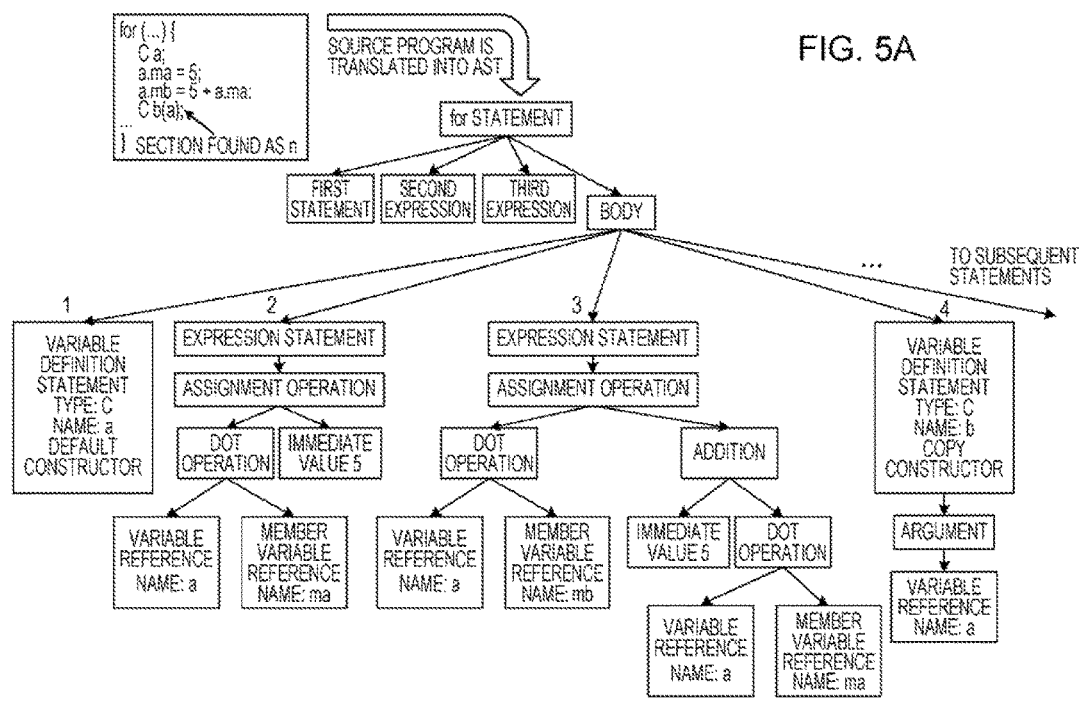
FIG. 5A is a diagram describing a peripheral search.

FIGS. 5A to 5G are diagrams describing the peripheral search. FIG. 5A illustrates an example of a for statement to execute the peripheral search and a corresponding AST 3. In the for statement illustrated in FIG. 5A, the fourth statement C b(a) included in a body starting from {is a call to a copy constructor, and n indicates a node corresponding to C b(a) in the AST 3.

Figure 5B:
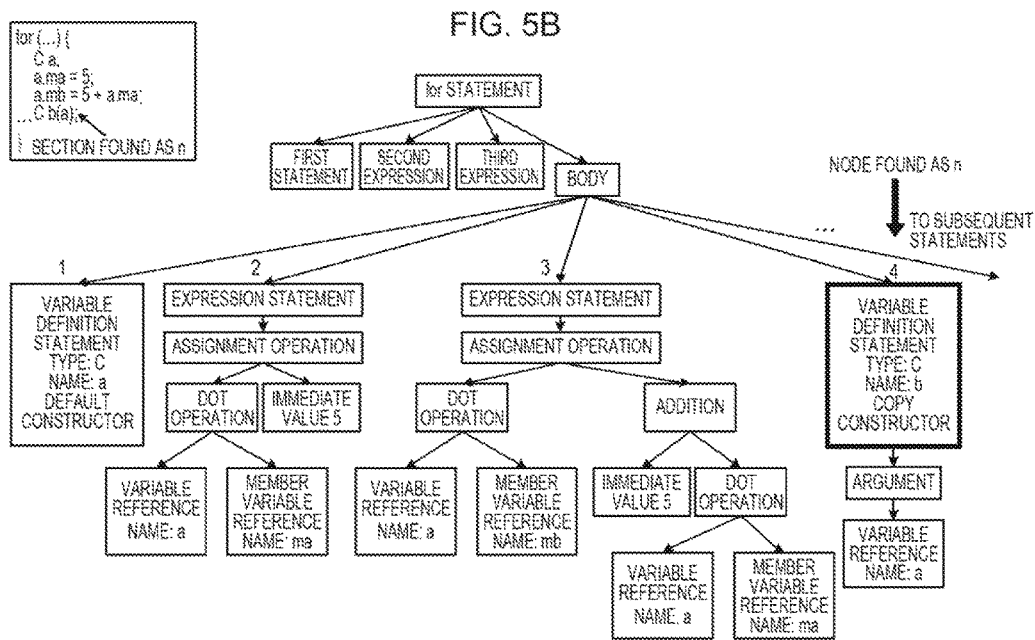
FIG. 5B is a diagram describing the peripheral search.

FIG. 5B illustrates a variable definition statement whose type is C and whose name is b and that is identified as n. If n is not a statement, the calculating section 23 goes back to a statement in the AST 3. In this example, n indicates the statement, and the calculating section 23 does not go back to another statement. As illustrated in FIG. 5C, the calculating section 23 makes an access list empty. The access list is a list of sections indicating access to member variables of variables of a class to be optimized and corresponds to the change section list 6 illustrated in FIG. 3.

If a periphery of n is two statements before n and two statements after n, the calculating section 23 identifies, as the two statements before n, a.ma=5 and a.mb=5+a.ma, as illustrated in FIG. 5D. Then, the calculating section 23 follows child nodes of an expression statement having a number 2 added thereto in the AST 3 and finds access to the member variable of the variable of the copy source, as illustrated in FIG. 5E. In FIG. 5E, the calculating section 23 follows, as the child nodes of the expression statement having the number 2 added thereto, an assignment operation, a dot operation, a variable reference whose name is a, and a member variable reference whose name is ma in this order, and the calculating section 23 finds the member variable a.ma of the variable of the copy source.

Figure 5F:
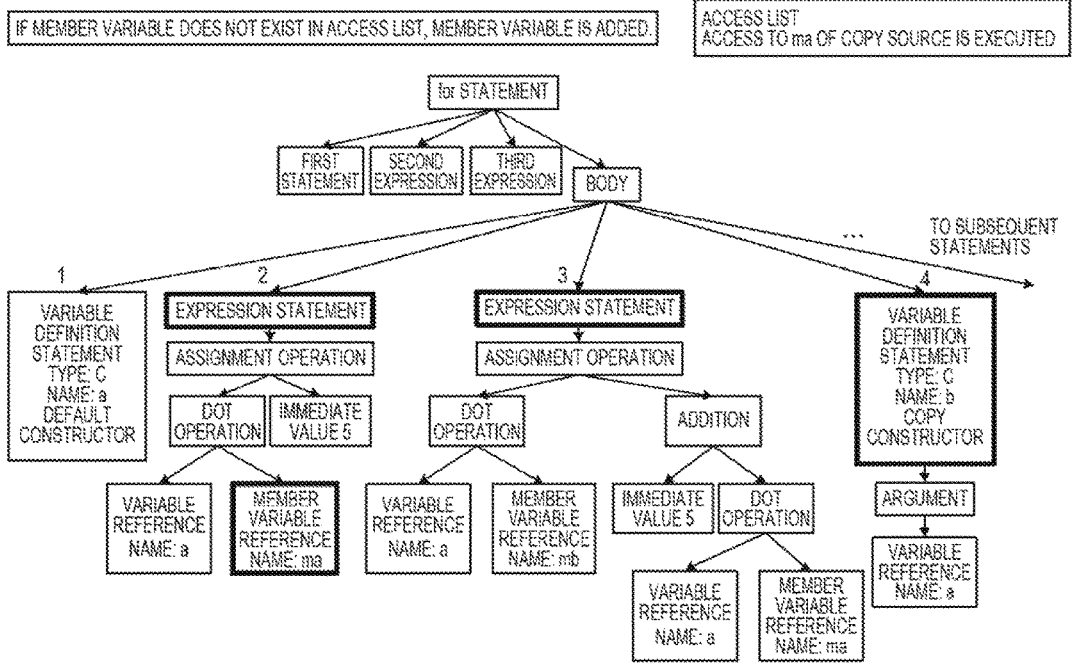
FIG. 5F is a diagram describing the peripheral search.

Then, the calculating section 23 adds access to ma of the copy source to the access list, as illustrated in FIG. 5F. If the found member variable is already registered in the access list, the calculating section 23 does not add the member variable to the access list.

Figure 5G:
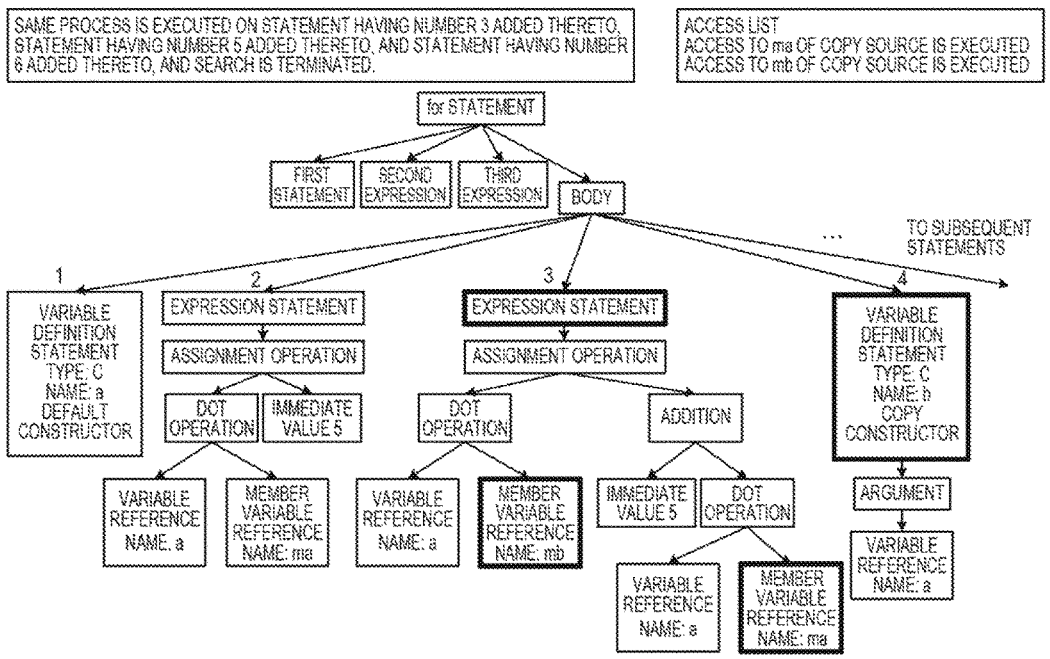
FIG. 5G is a diagram describing the peripheral search.

Then, the calculating section 23 executes the same process on an expression statement having a number 3 added thereto in the AST 3, finds a member variable a.mb of the variable of the copy source, and adds the found member variable a.mb to the access list, as illustrated in FIG. 5G. Then, the calculating section 23 executes the same process on expression statements (having numbers 5 and 6 added thereto) indicated as subsequent statements in FIG. 5G.

The generating section 24 compares the number, calculated by the calculating section 23, of times of the access with the number of times of memory access in a default copy process. If the number, calculated by the calculating section 23, of times of the access is smaller than the number of times of the memory access in the default copy process, the generating section 24 executes the optimization and generates the modified AST 4.

If a central processing unit (CPU) configured to execute the executable code 7 has a single instruction multiple data (SIMD) command, the generating section 24 may treat the number of times of the memory access in the default copy process as a number based on the use of the SIMD command. In addition, if a software pipeline is able to be installed, the generating section 24 may treat the number of times of the memory access in the default copy process as a number based on the use of a long register and a shift command.

Specifically, as the optimization, the generating section 24 adds a method for copying in units of member variables and adds the definition of an optimized copy constructor and the definition of an optimized copy method to the class to be optimized, regarding definition sections. Then, the generating section 24 replaces the copy constructor to be optimized with the optimized copy constructor and replaces the assignment operator to be optimized with the optimized copy method, regarding usage sections.

Figure 6A:
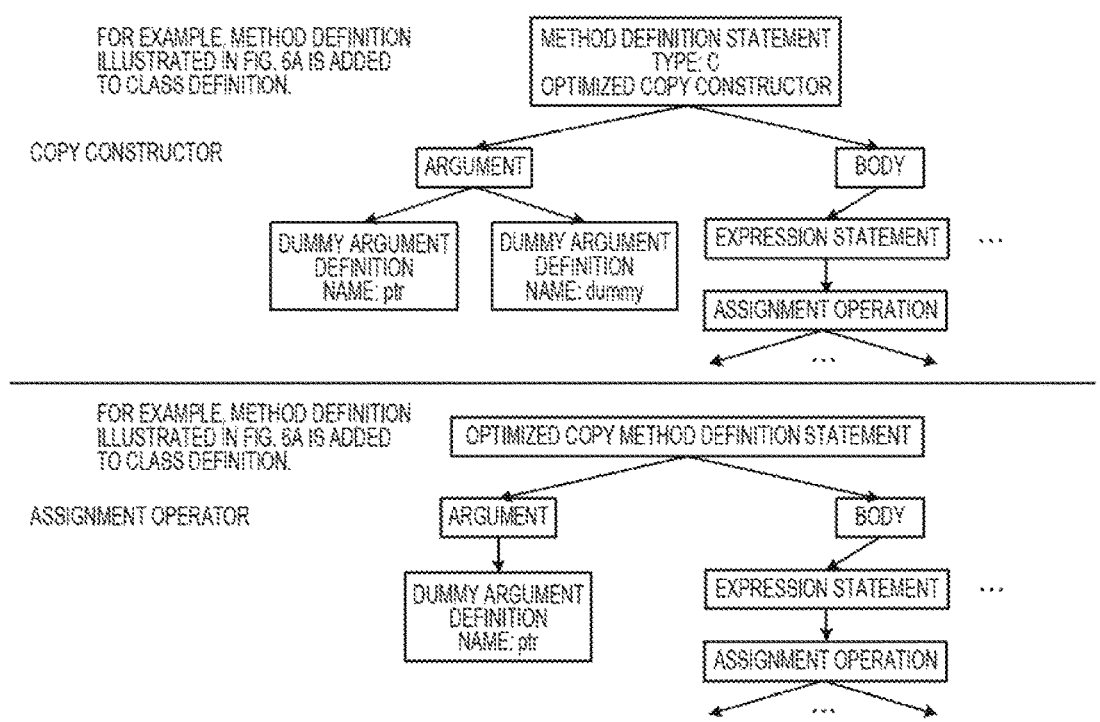
FIG. 6A is a diagram illustrating an example of an optimized copy instructor and the definition of an optimized copy method.

FIG. 6A is a diagram illustrating an example of the optimized copy constructor and the definition of the optimized copy method. As illustrated in FIG. 6A, for the copy constructor, a partial tree whose parent node is a method definition statement whose type indicates C and in which the optimized copy constructor is used is added to a class definition in the AST 3. For the assignment operator, a partial tree whose parent node is an optimized copy method definition statement is added to the class definition in the AST 3.

Figure 6B:
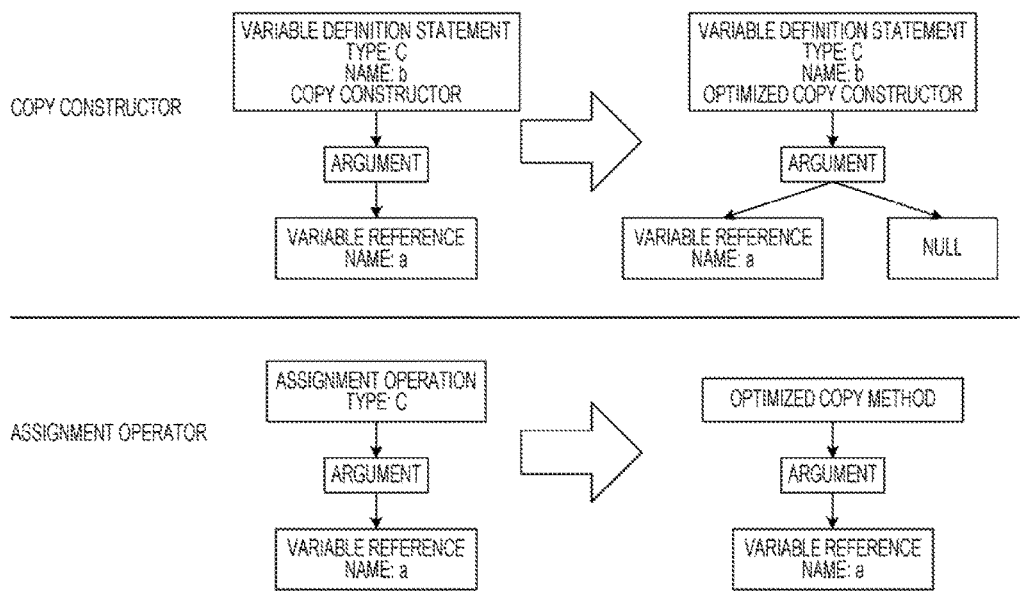
FIG. 6B is a diagram illustrating an example of replacement with the optimized copy instructor and the optimized copy method.

FIG. 6B is a diagram illustrating an example of the replacement with the optimized copy constructor and the optimized copy method. As illustrated in FIG. 6B, for the copy constructor, a copy constructor of a variable definition statement is replaced with the optimized copy constructor in the AST 3. For the assignment operator, an assignment operation is replaced with the optimized copy method in the AST 3.

Figure 7:
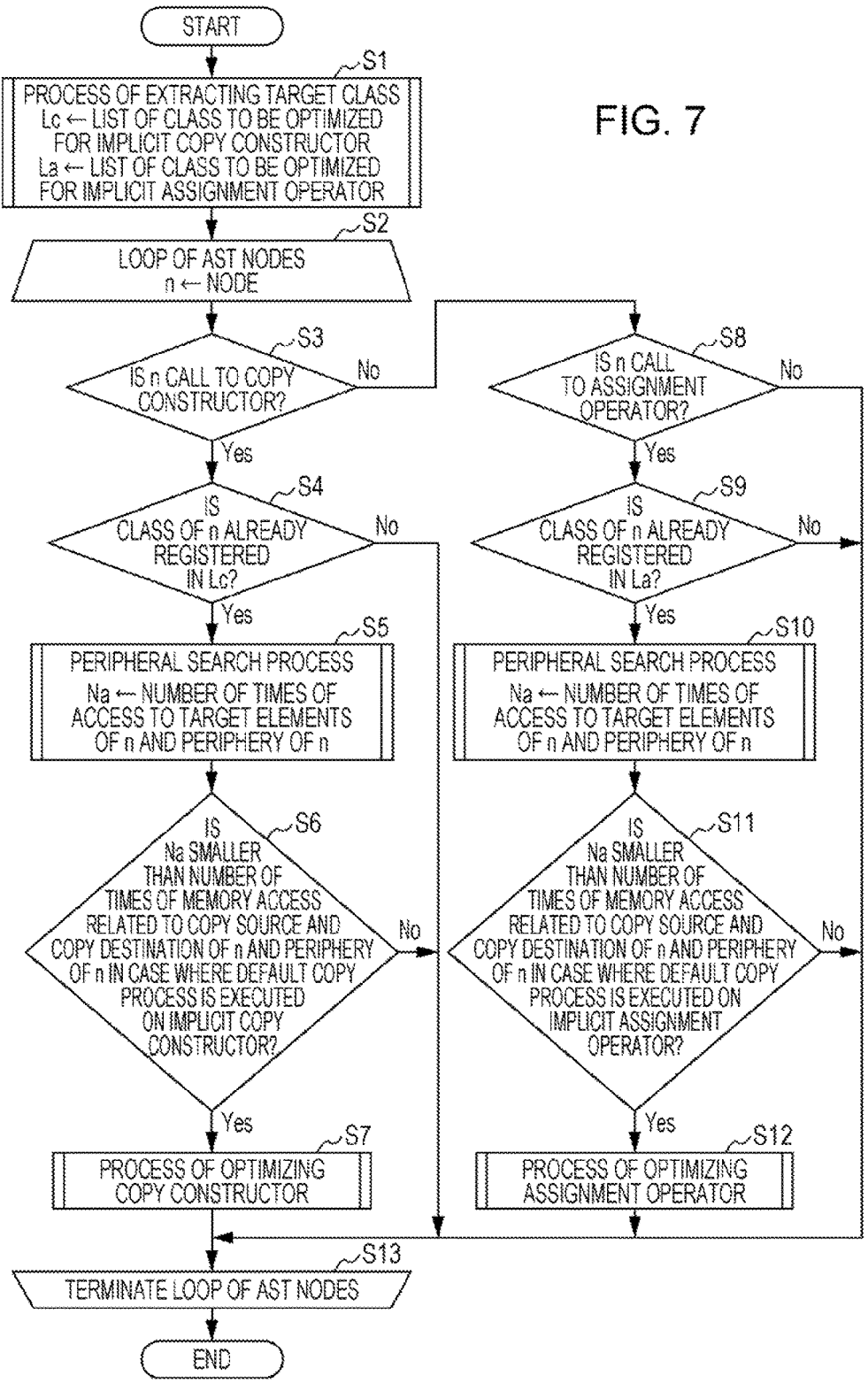
FIG. 7 is a flowchart illustrating the flow of an optimization process.

Next, the flow of an optimization process is described. FIG. 7 is a flowchart indicating the flow of the optimization process. As illustrated in FIG. 7, the optimization processing section 20 executes a process of extracting a class to be optimized (in step S1). By the execution of the process of extracting the class to be optimized, a list of the class to be optimized is assigned to Lc for an implicit copy constructor and assigned to La for an implicit assignment operator. Note that "←" indicates assignment. Each of Lc and La corresponds to the target class 5 illustrated in FIG. 3.

Then, the optimization processing section 20 extracts the nodes of the AST 3 in order from the root of the AST 3 and sequentially assigns the extracted nodes to n (in step S2) and repeats processes of steps S3 to S12 after step S2 and before step S13.

In the processes of steps S3 to S12, the optimization processing section 20 determines whether or not n is a call to the copy constructor (in step S3). If n is the call to the copy constructor, the optimization processing section 20 determines whether or not a class of n is already registered in Lc (in step S4). If the class of n is not registered in Lc, the optimization processing section 20 assigns a next node to n and causes the process to return to step S3.

If the class of n is already registered in Lc, the optimization processing section 20 searches n and a periphery of n and executes a process of calculating the number of times of access to target elements (in step S5). The target elements are member variables of a copy source and copy destination of a copy process executed based on the call, assigned to n, to the copy constructor or the assignment operator. By the execution of the calculation process, the number of times of the access to the target elements indicated in n and the periphery of n is assigned to Na.

Then, the optimization processing section 20 determines whether or not Na is smaller than the number of times of memory access related to the copy source and copy destination of n and the periphery of n in a case where the default copy process is executed on the implicit copy constructor (in step S6). If Na is not smaller than the number of times of the memory access, the optimization processing section 20 assigns the next node to n and causes the process to return to step S3. If Na is smaller than the number of times of the memory access, the optimization processing section 20 executes a process of optimizing the copy constructor (in step S7), assigns the next node to n, and causes the process to return to step S3.

If n is not the call to the copy constructor, the optimization processing section 20 determines whether or not n is a call to the assignment operator (in step S8). If n is not the call to the assignment operator, the optimization processing section 20 assigns the next node to n and causes the process return to step S3. If n is the call to the assignment operator, the optimization processing section 20 determines whether or not the class of n is already registered in La (in step S9). If the class of n is not registered in La, the optimization processing section 20 assigns the next node to n and causes the process to return to step S3.

If the class of n is already registered in La, the optimization processing section 20 executes a calculation process (in step S10). Then, the optimization processing section 20 determines whether or not Na is smaller than the number of times of memory access related to the copy source and copy destination of n and the periphery of n in a case where the default copy process is executed on the implicit assignment operator (in step S11). If Na is not smaller than the number of times of the memory access, the optimization processing section 20 assigns the next node to n and causes the process to return to step S3. If Na is smaller than the number of times of the memory access, the optimization processing section 20 executes a process of optimizing the assignment operator (in step S12), assigns the next node to n, and causes the process to return to step S3.

In this manner, the optimization processing section 20 calculates the number of times of the access to the target elements of the call to the copy constructor or assignment operator of the class to be optimized and the periphery of the call. Then, the optimization processing section 20 determines whether or not the calculated number of times of the access is smaller than the number of times of the memory access related to the copy source and copy destination of n and the periphery of n in a case where the default copy process is executed on the copy constructor or the assignment operator. If the calculated number of times of the access is smaller, the optimization processing section 20 optimizes the copy constructor or the assignment operator. Thus, the compiling section 1a may generate the executable code 7 that reduces the number of times of memory access upon the execution.

Figure 8:
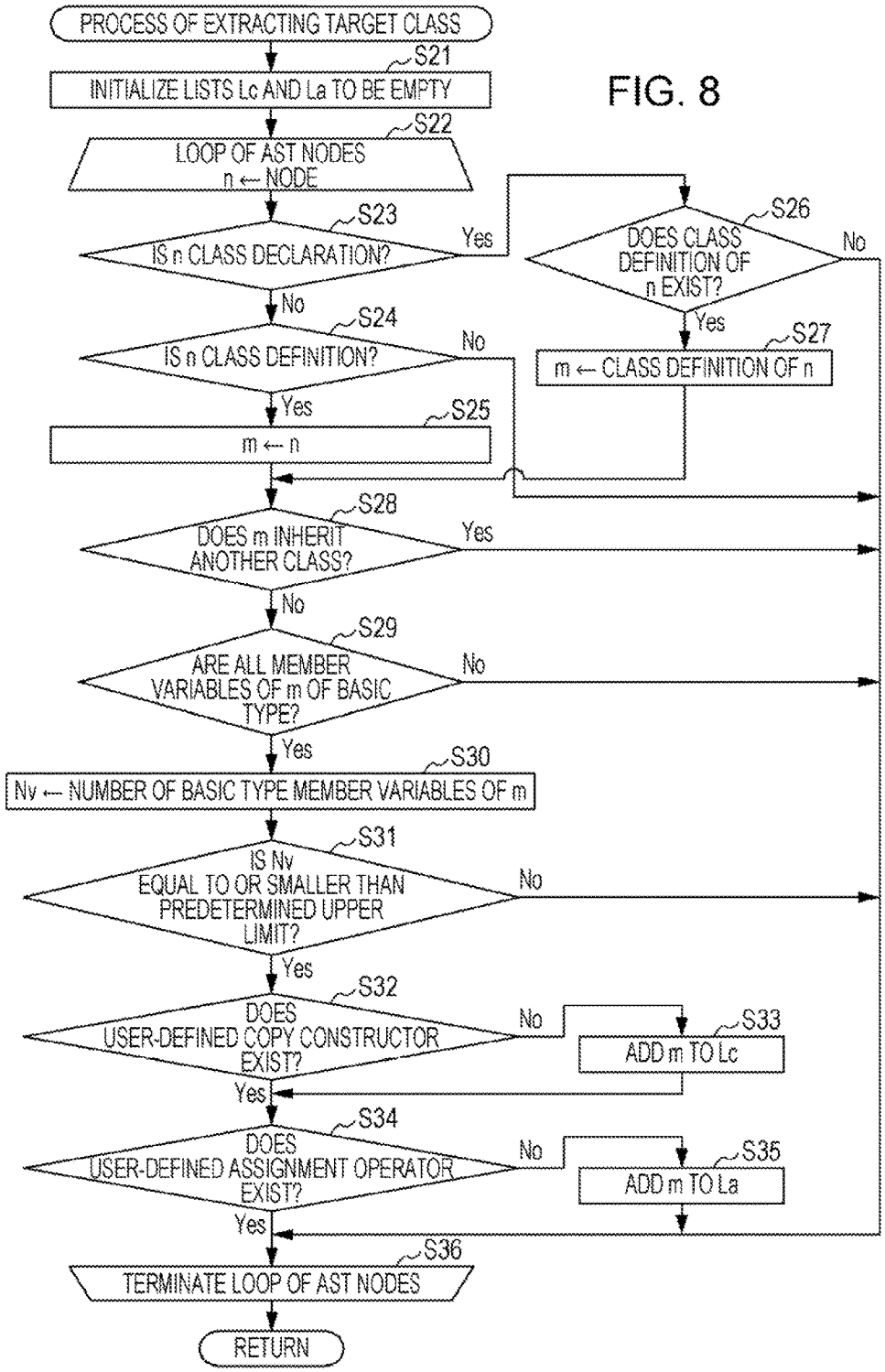
FIG. 8 is a flowchart illustrating the flow of a process of extracting a target class.

Next, the flow of a process of extracting the target class is described. FIG. 8 is a flowchart indicating the flow of the process of extracting the target class. As illustrated in FIG. 8, the extracting section 21 initializes the list Lc and the list La to be empty (in step S21).

Then, the extracting section 21 extracts the nodes of the AST 3 in order from the root of the AST 3 and sequentially assigns the nodes to n (in step S22) and repeats processes of steps S23 to S35 after step S22 and before step S36. In the processes of steps S23 to S35, the extracting section 21 determines whether or not n is a class declaration (in step S23), and if n is not the class declaration, the extracting section 21 determines whether or not n is a class definition (in step S24). If n is not the class definition, the extracting section 21 assigns the next node to n and causes the process to return to step S23.

If n is the class definition, the extracting section 21 assigns n to m (in step S25) and causes the process to proceed to S28. If n is the class declaration, the extracting section 21 determines whether or not a class definition of n exists (in step S26). If the class definition of n does not exist, the extracting section 21 assigns the next node to n and causes the process to return to step S23. If the class definition of n exists, the extracting section 21 assigns the class definition of n to m (in step S27) and causes the process to proceed to step S28.

Then, the extracting section 21 determines whether or not m inherits another class (in step S28). If m inherits the other class, the extracting section 21 assigns the next node to n and causes the process to return to step S23. If m does not inherit the other class, the extracting section 21 determines whether or not all member variables of m are of the basic type (in step S29). If any of all the member variables of m is not of the basic type, the extracting section 21 assigns the next node to n and causes the process to return to step S23.

If all the member variables of m are of the basic type, the extracting section 21 assigns the number of the basic type member variables of m to Nv (in step S30). Then, the extracting section 21 determines whether or not Nv is equal to or smaller than a predetermined upper limit (in step S31). If Nv exceeds the predetermined upper limit, the extracting section 21 assigns the next node to n and causes the process to return to step S23.

If Nv is equal to or smaller than the predetermined upper limit, the extracting section 21 determines whether or not a user-defined copy constructor exists (in step S32). If the user-defined copy constructor does not exist, the extracting section 21 adds m to Lc (in step S33). Then, the extracting section 21 determines whether or not a user-defined assignment operator exists (in step S34). If the user-defined assignment operator does not exist, the extracting section 21 adds m to La (in step S35).

Since the extracting section 21 follows the nodes of the AST 3 in order and generates the list of the class to be optimized in the aforementioned manner, the optimization processing section 20 may optimize the class included in the list.

Figure 9:
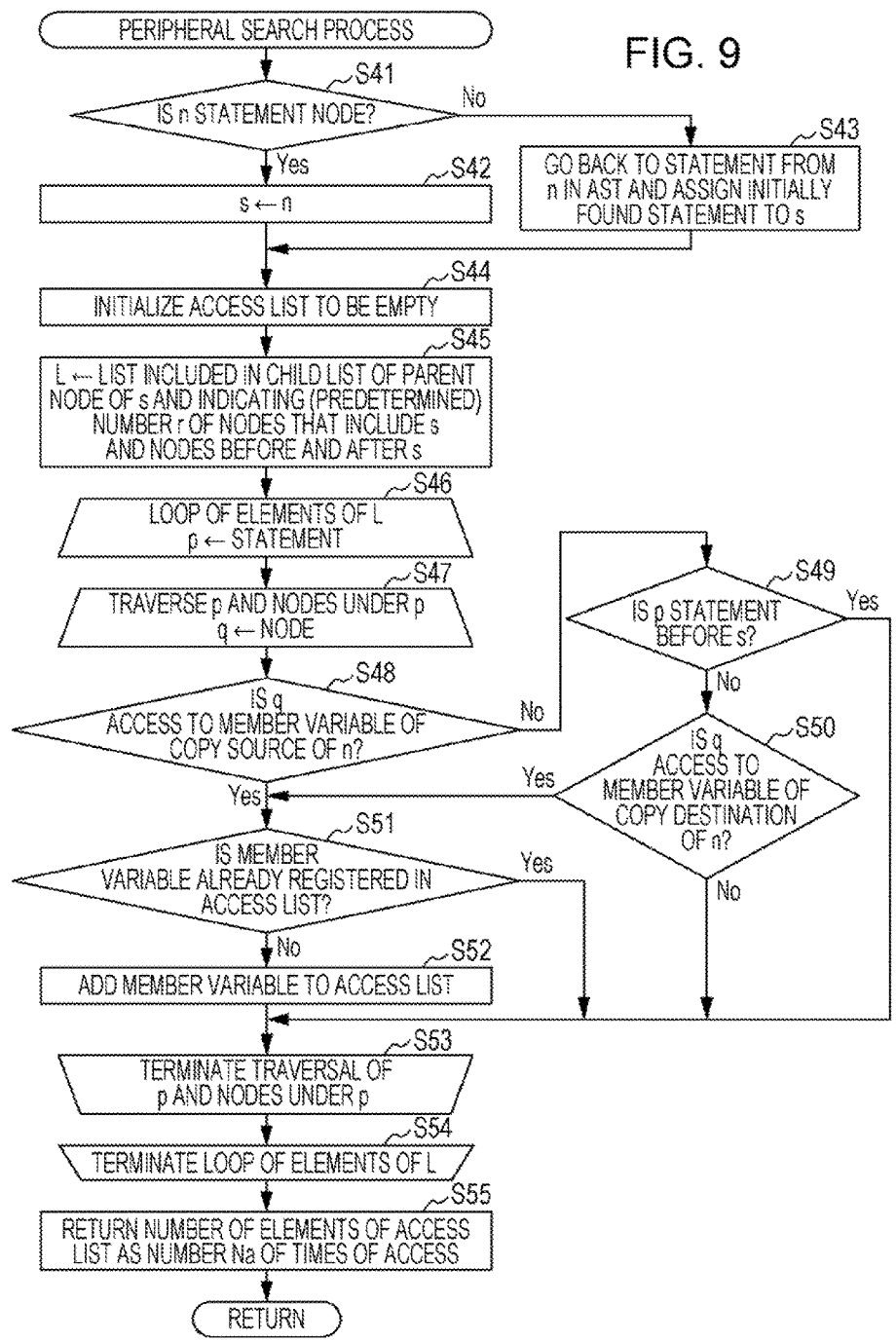
FIG. 9 is a flowchart illustrating the flow of a peripheral search process.

Next, the flow of the calculation process is described. FIG. 9 is a flowchart indicating the flow of the calculation process. As illustrated in FIG. 9, the calculating section 23 determines whether or not n is a statement node (in step S41). If n is the statement node, the calculating section 23 assigns s to n (in step S42). If n is not the statement node, the calculating section 23 goes back to a statement from n in the AST 3 and assigns the initially found statement to s (in step S43).

Then, the calculating section 23 initializes the access list to be empty (in step S44) and assigns, to L, a list included in a child list of a parent node of s and indicating a number r of nodes that are immediately before and after s and include s (in step S45). Then, the calculating section 23 sequentially assigns statements of elements of L to p (in step S46) and repeats processes of steps S47 to S53 after step S46 and before step S54.

In the processes of steps S47 to S53, the calculating section 23 sequentially assigns p and nodes under p to q (in step S47) and repeats the processes of steps S48 to S52 after step S47 and before step S53. In the processes of steps S48 to S52, the calculating section 23 determines whether or not q is access to a member variable of the copy source (in step S48). If q is the access to the member variable of the copy source, the calculating section 23 causes the process to proceed to step S51.

If p is not the access to the member variable of the copy source, the calculating section 23 determines whether or not p is a statement before s (in step S49). If p is the statement before s, the calculating section 23 assigns the next node to q and causes the process to return to step S48. If p is not the statement before s, the calculating section 23 determines whether or not q is access to a member variable of the copy destination (in step S50). If q is not the access to the member variable of the copy destination, the calculating section 23 assigns the next node to q and causes the process to return to S48. If q is the access to the member variable of the copy destination, the calculating section 23 causes the process to proceed to step S51.

Then, the calculating section 23 determines whether or not the member variable to be accessed is already registered in the access list (in step S51). If the member variable to be accessed is already registered in the access list, the calculating section 23 assigns the next node to q and causes the process to return to step S48. If the member variable to be accessed is not registered in the access list, the calculating section 23 adds the member variable to the access list (in step S52), assigns the next node to q, and causes the process to return to step S48.

If the processes of steps S48 to S52 are completely executed on p and all nodes under p before the assignment of the next node to q, the calculating section 23 assigns a next element of L to p and executes the processes of steps S47 to S53.

After executing the processes of steps S47 to S53 on all the elements of L, the calculating section 23 returns the number of the elements of the access list as a number Na of times of access (in step S55).

Since the calculating section 23 calculates the number of times of access to member variables of a copy source and copy destination of n and a periphery of n in the aforementioned manner, the optimization processing section 20 may avoid an increase in the number of times of memory access by executing the optimization.

Figure 10:
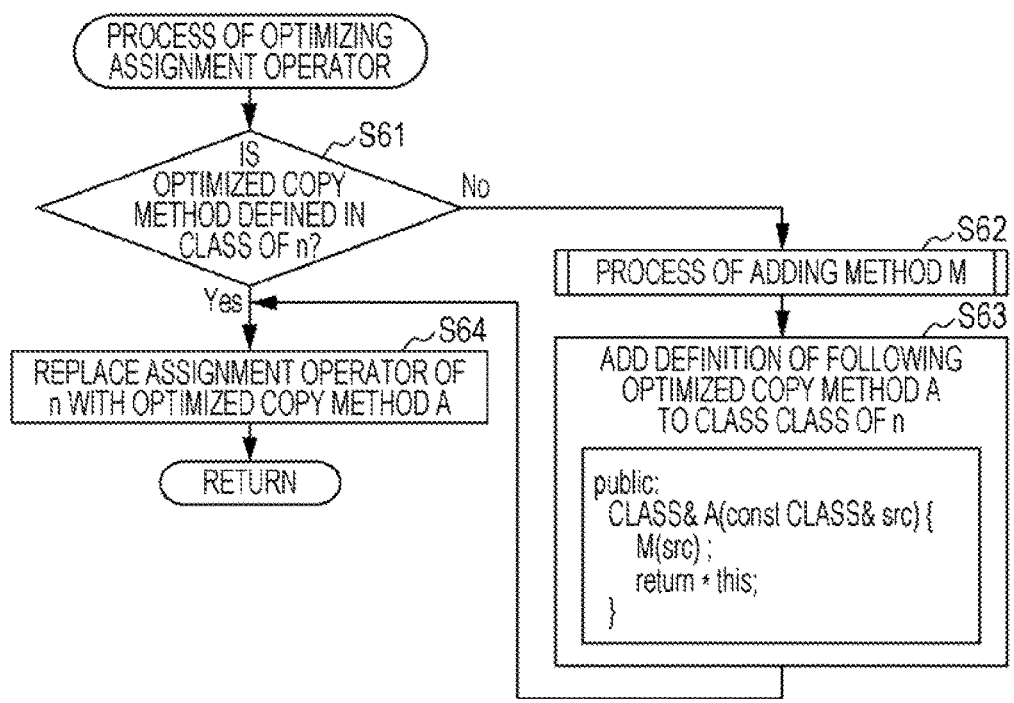
FIG. 10 is a flowchart illustrating the flow of a process of optimizing an assignment operator.

Next, the flow of the process of optimizing the assignment operator is described. FIG. 10 is a flowchart indicating the flow of the process of optimizing the assignment operator. As illustrated in FIG. 10, the generating section 24 determines whether or not an optimized copy method is already defined in the class of n (in step S61).

If the optimized copy method is not defined, the generating section 24 executes a process of adding a method M for copying in units of member variables (in step S62). The generating section 24 adds the following definition of the optimized copy method A to the class CLASS of n (in step S63).

```
public:
    CLASS& A(const CLASS& src){
    M(src);
    return * this;
    }
```

Then, the generating section 24 replaces the assignment operator of n with the optimized copy method A (in step S64).

Since the generating section 24 adds the method M and the definition of the optimized copy method A to the class of n and replaces the assignment operator of n with the optimized copy method A in the aforementioned manner, the optimization processing section 20 may optimize the assignment operator.

Figure 11:
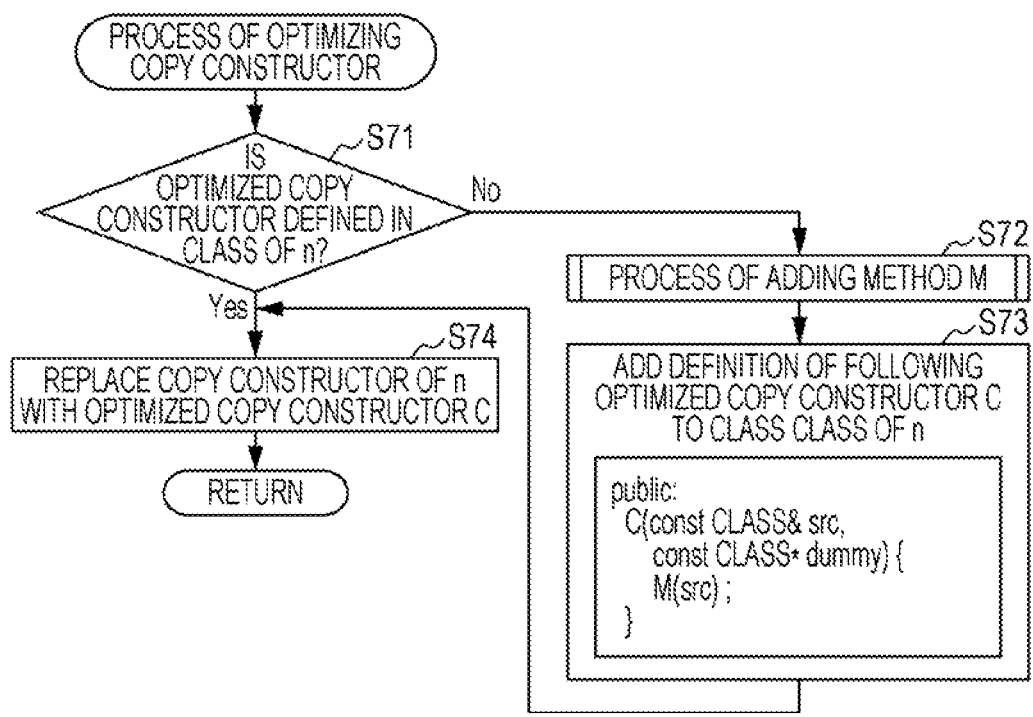
FIG. 11 is a flowchart illustrating the flow of a process of optimizing a copy constructor.

Next, the flow of the process of optimizing the copy constructor is described. FIG. 11 is a flowchart indicating the flow of the process of optimizing the copy constructor. As illustrated in FIG. 11, the generating section 24 determines whether or not an optimized copy constructor is already defined in the class of n (in step S71).

If the optimized copy constructor is not defined, the generating section 24 executes the process of adding the method M (in step S72) and adds the following definition of the optimized copy constructor C to the class CLASS of n (in step S73).

```
public:
C(const CLASS& src,
const CLASS* dummy){
M(src);
}
```

Then, the generating section 24 replaces the copy constructor of n with the optimized copy constructor C (in step S74).

Since the generating section 24 adds the method M and the definition of the optimized copy constructor C to the class of n and replaces the copy constructor of n with the optimized copy constructor C, the optimization processing section 20 may optimize the copy constructor.

Figure 12:
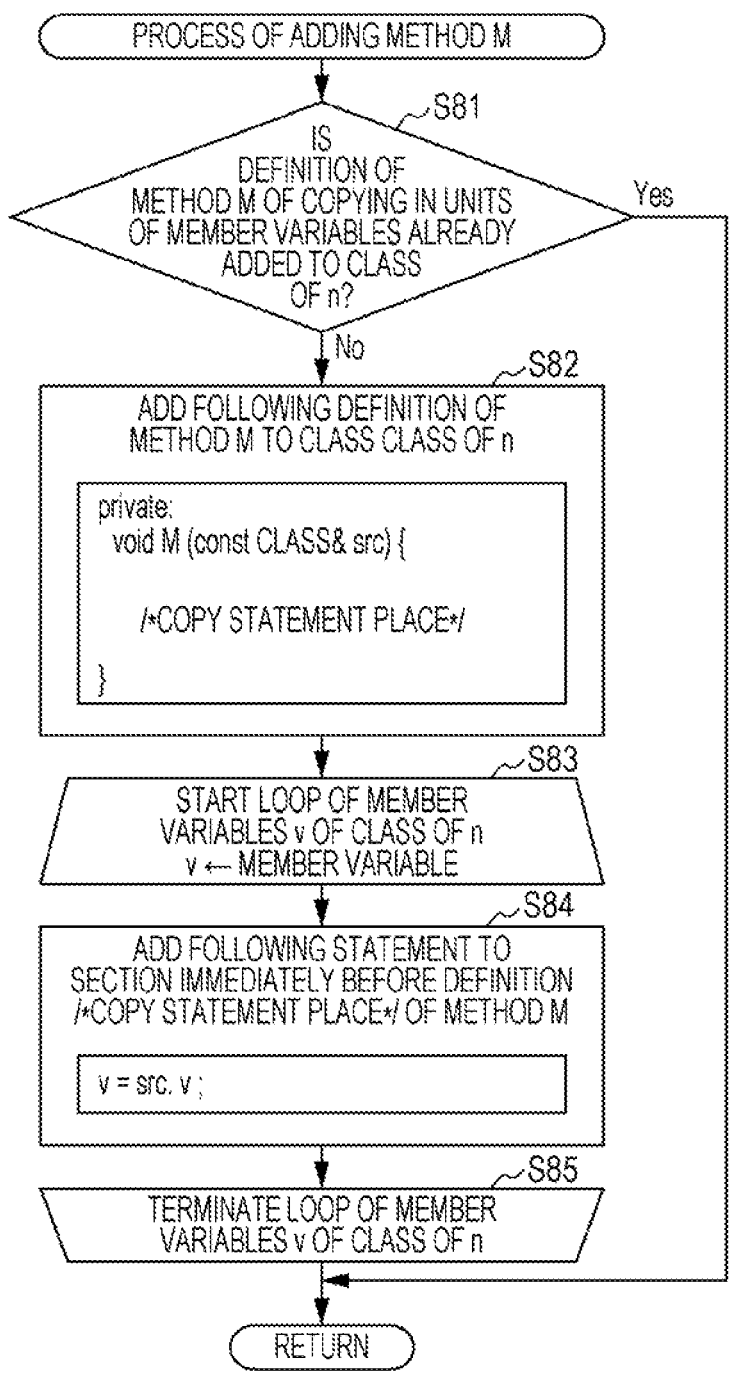
FIG. 12 is a flowchart illustrating the flow of a process of adding a method.

Next, the flow of the process of adding the method M is described. FIG. 12 is a flowchart indicating the flow of the process of adding the method M. As illustrated in FIG. 12, the generating section 24 determines whether or not the definition of the method M for copying in units of member variables is already added to the class CLASS of n (in step S81). If the definition of the method M is already added, the generating section 24 terminates the process.

If the definition of the method M is not added, the generating section 24 adds the following definition of the method M to the class CLASS of n (in step S82).

```
private:
void M(const CLASS& src){
/* COPY STATEMENT PLACE */
}
```

Then, the generating section 24 sequentially assigns member variables of the class of n to v (in step S83) and repeats a process of step S84 after step S83 and before step S85. The generating section 24 adds the following statement to a section immediately before the definition /* COPY STATEMENT PLACE */ of the method M (in step S84).
v=src.v;

In this manner, the generating section 24 adds the definition of the method M for copying in units of member variables and may use the method M for the optimized copy constructor and the optimized copy method.

As described above, in the embodiment, the extracting section 21 analyzes the AST 3 and extracts, as the class to be optimized, the class in which the implicit copy constructor or the implicit assignment operator is used. Then, the identifying section 22 analyzes the AST 3 and identifies the call to the copy constructor or assignment operator of the class to be optimized.

Then, the calculating section 23 searches the call to the copy constructor or assignment operator of the class to be optimized and the periphery of the call and calculates the number of times of access to member variables of the copy source and copy destination of the copy process executed based on the call.

Then, the generating section 24 compares the number, calculated by the calculating section 23, of times of the access with the number of times of the memory access related to the copy source and copy destination of the call and the periphery of the call in the case where the default copy process is executed on the call to the copy constructor or the assignment operator. Then, if the number, calculated by the calculating section 23, of times of the access is smaller, the generating section 24 adds, to the AST 3, the definition of the method of executing the copy process on the copy constructor or the assignment operator in units of member variables. Then, the generating section 24 modifies the AST 3 so that the definition added based on the call to the copy constructor or the assignment operator is used.

Thus, the compiling section 1a may generate the executable code 7 that reduces the number of times of memory access, compared with the case where the default copy process is executed on the call to the copy constructor or the assignment operator.

In the embodiment, the calculating section 23 calculates the number of times of access to a member variable of a copy source before a call to a copy constructor or an assignment operator in the peripheral search and calculates the number of times of access to the member variable of the copy source and a member variable of a copy destination after the call to the copy constructor or the assignment operator in the peripheral search. Thus, the calculating section 23 may accurately calculate the number of times of access related to the call to the copy constructor or the assignment operator.

In the embodiment, the extracting section 21 treats, as a class to be optimized, a class that does not inherit another class and in which all member variables whose number is equal to or smaller than the predetermined upper limit are of the basic type, and the extracting section 21 extracts the class to be optimized without executing a complex process.

The embodiment describes the compiling section 1a, but a compiler program having the same features as the compiling section 1a may be obtained by achieving the configuration of the compiling section 1a by the software. A computer configured to execute the compiler program is described below. The computer configured to execute the compiler program may be the information processing device 1 or a computer different from the information processing device 1.

Figure 13:
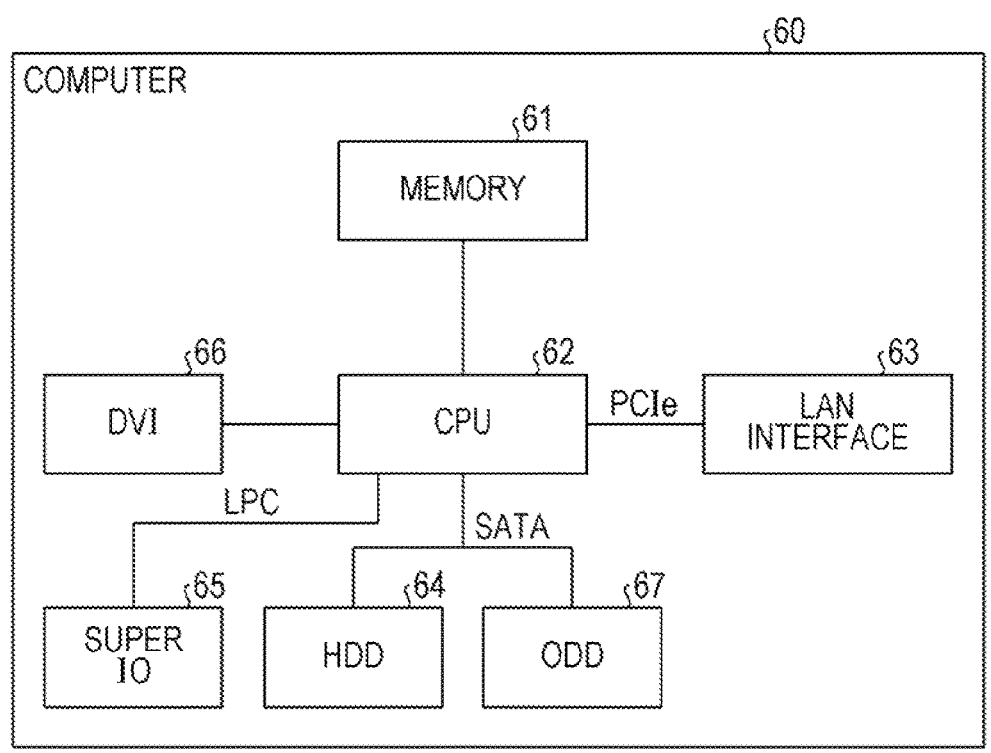
FIG. 13 is a diagram illustrating a hardware configuration of a computer configured to execute a compiler program according to the embodiment.
Figure 14:
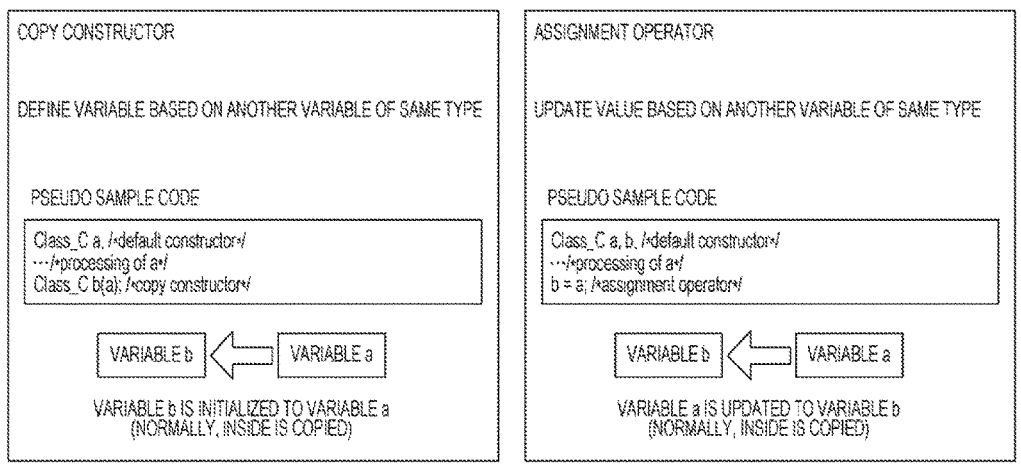
FIG. 14 is a diagram describing a copy process executed when a copy constructor or an assignment operator is used.
Figure 15:
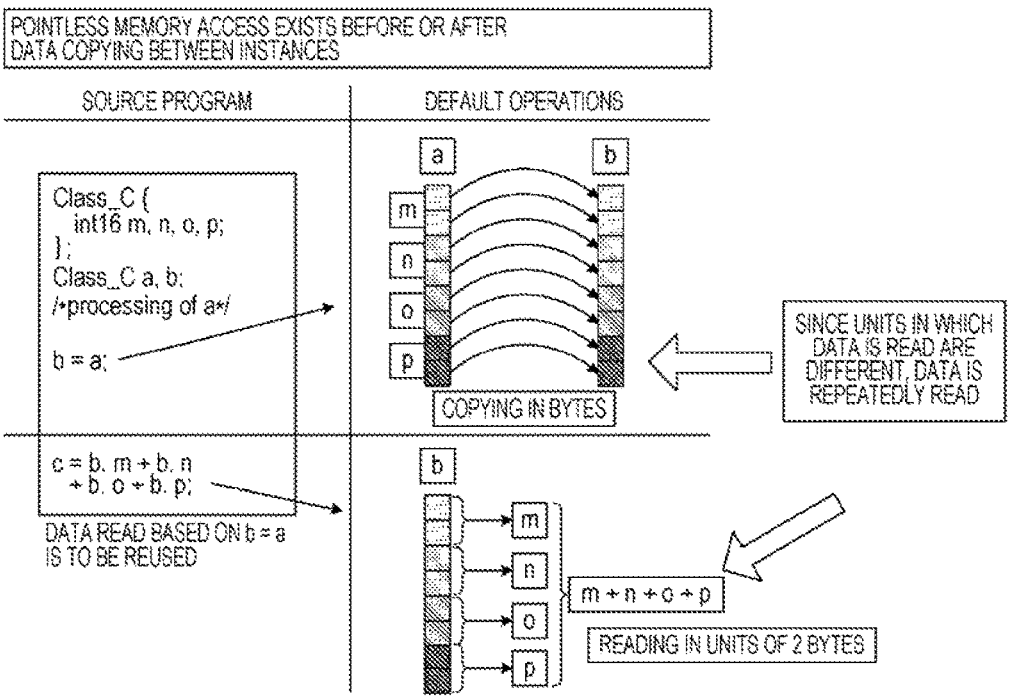
FIG. 15 is a diagram describing a problem with copying between variables that is illustrated in FIG. 14.

FIG. 13 is a diagram illustrating a hardware configuration of the computer configured to execute the compiler program according to the embodiment. As illustrated in FIG. 13, the computer 60 includes a memory 61, a CPU 62, a local area network (LAN) interface 63, and a hard disk drive (HDD) 64. The computer 60 also includes a super input output (IO) 65, a digital visual interface (DVI) 66, and an optical disc drive (ODD) 67.

The memory 61 stores the program, intermediate results of executing the program, and the like. The CPU 62 is a central processing unit configured to read the program from the memory 61 and execute the program. The CPU 62 includes a chipset having a memory controller.

The LAN interface 63 connects the computer 60 to another computer via a LAN. The HDD 64 is a disk device configured to store the program and data. The super IO 65 is an interface configured to connect the computer 60 to input devices such as a mouse and a keyboard. The DVI 66 is configured to connect the computer 60 to a liquid crystal display device. The ODD 67 is a device configured to execute reading and writing from and in a DVD.

The LAN interface 63 is connected to the CPU 62 by PCI Express (PCIe). The HDD 64 and the ODD 67 are connected to the CPU 62 by Serial Advanced Technology Attachment (SATA). The super IO 65 is connected to the CPU 62 by Low Pin Count (LPC).

The data processing program to be executed by the computer 60 is stored in the DVD, read by the ODD 67 from the DVD, and installed in the computer 60. Alternatively, the data processing program may be stored in a database of another computer system connected to the computer 60 via the LAN interface 63 or the like and may be read from the database and installed in the computer 60. Then, the installed data processing program is stored in the HDD 64, read into the memory 61, and executed by the CPU 62.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing device comprising:
   a memory; and
   a processor coupled to the memory and the processor configured to:
   extract a class in which a copy constructor included in a source code or an assignment operator included in the source code are used,
   identify a call to the copy constructor or assignment operator included in the class extracted by the processor,
   calculate a number of times of access to member variables, indicated in the call identified by the processor and a periphery of the call, of a copy source and a copy destination of a copy process executed based on the call;
   compare the calculated number with a number of times of memory access related to a copy source and a copy destination of the call and the periphery of the call, based on a default copy process being executed by the processor based on the call, and
   generate an intermediate code having, added thereto, information to be used to execute a process for copying the constructor or the assignment operator in units of member variables and generate an intermediate code having information added thereto based on the call when the number, calculated by the processor, of times of the access is smaller than a number of times of the memory access.

2. The information processing device according to claim 1,
   wherein the processor is configured to calculate the number of times of access to a member variable of the copy source of the copy process before the call identified by the processor and calculate the number of times of the access to the member variables of the copy source and copy destination of the copy process after the call identified by the processor.

3. The information processing device according to claim 1,
   wherein the processor is configured to extract a class that does not inherit another class and in which all member variables whose number is equal to or smaller than a predetermined upper limit are of a basic type.

4. A compilation method for causing a computer to execute a process, the process comprising:
   extracting a class in which a copy constructor included in a source code or an assignment operator included in the source code are used;
   identifying a call to the copy constructor or assignment operator included in the class extracted by the processor;
   calculating the number of times of access to member variables, indicated in the identified call and a periphery of the call, of a copy source and copy destination of a copy process executed based on the call;
   comparing the calculated number with a number of times of memory access related to a copy source and a copy destination of the call and the periphery of the call, based on a default copy process being executed by a processor based on the call; and
   generating an intermediate code having, added thereto, information to be used to execute a process for copying the constructor or the assignment operator in units of member variables and generating an intermediate code having information added thereto based on the call when the calculated number of times of the access is smaller than a number of times of the memory access.

5. A non-transitory, computer-readable recording medium having stored therein a program for causing a computer to execute a process, the process comprising:
   extracting a class in which a copy constructor included in a source code or an assignment operator included in the source code are used;
   identifying a call to the copy constructor or assignment operator included in the class extracted by the processor;
   calculating the number of times of access to member variables, indicated in the identified call and a periphery of the call, of a copy source and copy destination of a copy process executed based on the call;
   comparing the calculated number with a number of times of memory access related to a copy source and a copy destination of the call and the periphery of the call, based on a default copy process being executed by the computer based on the call; and
   generating an intermediate code having, added thereto, information to be used to execute a process for copying the constructor or the assignment operator in units of member variables and generating an intermediate code having information added thereto based on the call when the calculated number of times of the access is smaller than a number of times of the memory access.

* * * * *